Nov. 12, 1968 A. E. GOLDSTEIN 3,410,092
RELIQUEFACTION CYCLE FOR LIQUID AIR CYCLE ENGINE
Filed July 17, 1961 2 Sheets-Sheet 1

INVENTOR.
ALLEN E. GOLDSTEIN
BY R.E. Giauque
ATTORNEY

Nov. 12, 1968   A. E. GOLDSTEIN   3,410,092
RELIQUEFACTION CYCLE FOR LIQUID AIR CYCLE ENGINE
Filed July 17, 1961   2 Sheets-Sheet 2

INVENTOR.
ALLEN E. GOLDSTEIN
BY
R.E. Geangue
ATTORNEY

United States Patent Office 3,410,092
Patented Nov. 12, 1968

3,410,092
RELIQUEFACTION CYCLE FOR LIQUID AIR CYCLE ENGINE
Allen E. Goldstein, Van Nuys, Calif., assignor to The Marquardt Corporation, Van Nuys, Calif., a corporation of California
Filed July 17, 1961, Ser. No. 124,680
7 Claims. (Cl. 60—204)

This invention relates to a reliquefaction cycle for a liquid air cycle engine and more particularly to a reliquefaction cycle for an engine employing a cryogenic liquid fuel which is used to liquefy air for use as an oxidant for the fuel. The reliquefying apparatus and method of the present invention are particularly suitable for use with present invention are particularly suitable for use with liquid air engine cycles in which liquid hydrogen is utilized as the source of engine fuel and is also utilized in heat exchange relationship to produce liquid air which serves as the oxidant for the hydrogen in the combustion chamber of the engine. As pointed out in pending application Ser. No. 84,889 filed Jan. 25, 1961, by James R. Hall entitled Liquid Air Engine Cycle With Reliquefaction and assigned to the same assignee, it is an inherent and fundamental feature of such engines that the hydrogen-air ratio required to achieve liquefaction of air in the engine's heat exchanger is several times greater than that desired for operation in the engine's combustion chamber. Since the hydrogen-air requirements of the heat exchanger are large with respect to the stoichiometric value of the hydrogen-air ratio in the combustion chamber, it is desirable to withdraw a portion of the hydrogen after it has passed through the heat exchanger and before it enters the combustion chamber so that a nearly stoichiometric fuel-air ratio can be maintained in the combustion chamber of the engine. As set forth in the above referred to patent application, the large hydrogen-air ratio required in the heat exchanger results from the "pinch point" effect at the point of incipient air liquefaction.

By the present invention, the withdrawn hydrogen can be recovered in the reliquefaction part of the cycle. The liquid hydrogen is stored in a tank and pumped to a high pressure prior to entering the heat exchanger which receives the ambient air to liquefy the same. The liquid air produced by the heat exchanger is pumped to the combustion chamber of the engine, and the hydrogen leaving the heat exchanger at high pressure and in gaseous form is connected directly to the combustion chamber of the engine. Since the air is in liquid form, it can be first used to cool the combustion chamber so that the air will also enter the combustion chamber in gaseous form. In order to reduce the fuel-air ratio in the combustion chamber, a portion of the high pressure, gaseous hydrogen leaving the heat exchanger is withdrawn and passed in heat exchange relationship with hydrogen vapor from the storage tank. The cooled, high pressure hydrogen is then expanded through a turbo expander to produce both hydrogen vapor and liquid which are returned directly to the hydrogen tank. The liquid part becomes associated with the stored hydrogen liquid whereas the vapor is permitted to return to the reliquefaction heat exchanger to cool further withdrawn hydrogen.

It is therefore an object of the present invention to provide a reliquefaction apparatus and method for use in a liquid air cycle engine in which a portion of the fuel is withdrawn from the heat exchanger and reliquefied in order to reduce the fuel-air ratio in the combustion chamber of the engine and provide a lower fuel consumption in the engine.

Another object of the present invention is to provide a reliquefaction cycle for a liquid air cycle engine in which the low temperature liquid hydrogen is used as the fuel and is passed in heat exchange relationship with incoming air to produce liquid air; a portion of the hydrogen being withdrawn before entering the engine combustion chamber for passage in heat exchange relationship with hydrogen vapor from the hydrogen tank before being expanded to the lower pressure of the hydrogen tank in order to produce liquid hydrogen and hydrogen vapor.

A further object of the invention is to provide a reliquefaction apparatus and method for use with a liquid air cycle engine, in which a portion of the hydrogen leaving the heat exchanger is passed in heat exchange relationship with cold hydrogen vapor drawn from the main hydrogen liquid tank and is thereafter expanded through a turbo expander to the lower pressure of the tank in order to produce some liquid and some vapor for further use in the heat exchange relationship.

These and other objects of the invention not specifically set forth above will become readily apparent from the accompanying description and drawings, in which.

Figure 1:
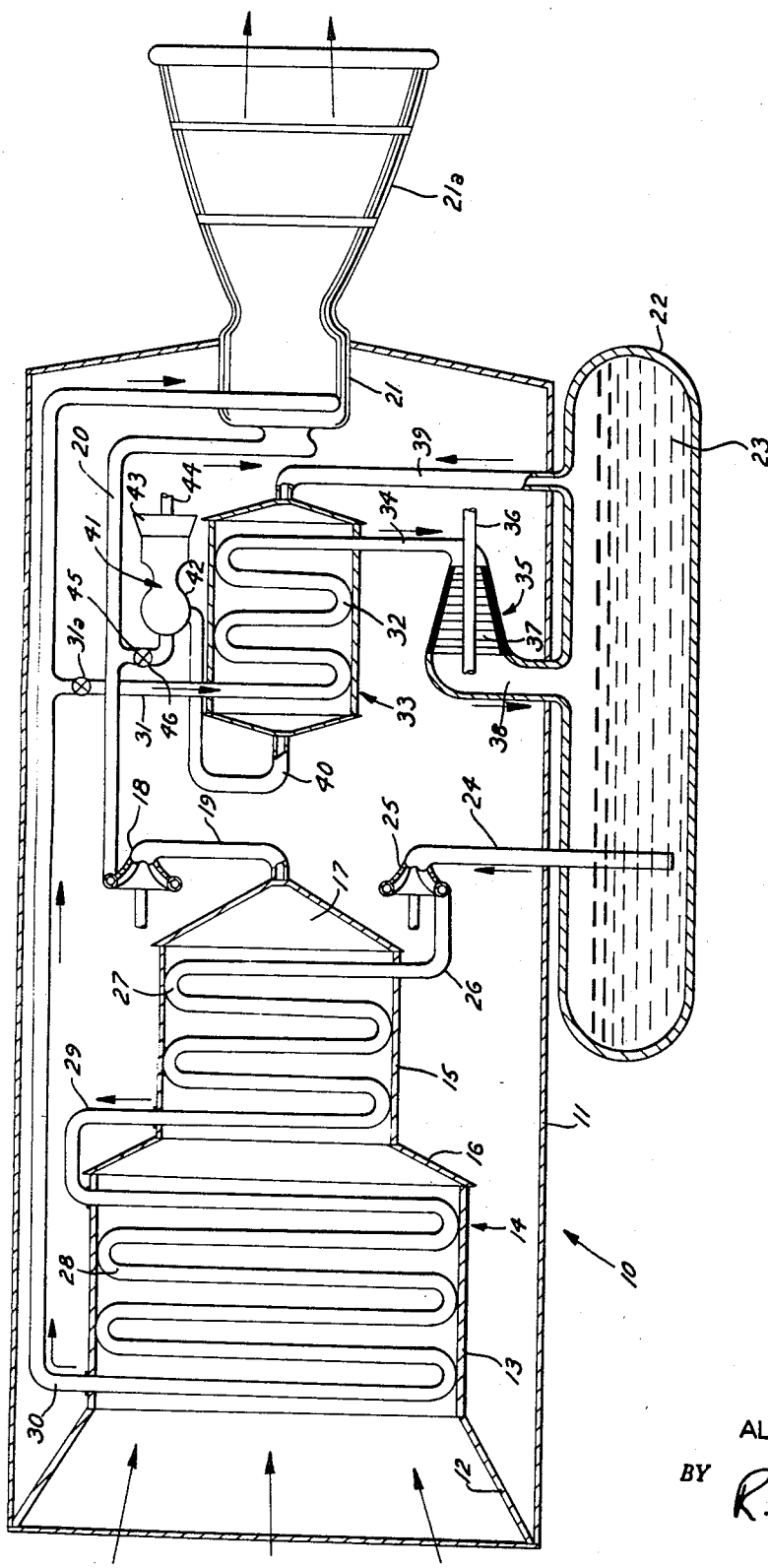
FIGURE 1 is a diagrammatic view of one form of liquid air cycle engine showing the heat exchanger and the turbo expander utilized in the reliquefaction cycle of the engine.

Referring to the embodiment of the invention illustrated in FIGURE 1, the engine 10 comprises an outer casing 11 which has a frusto conical inlet surface 12 leading to the precooling stage 13 of the heat exchanger 14. The precooling stage connects with the air liquefaction stage 15 through a reduced section 16, and the liquid air is collected in the compartment 17 located at the end of the liquefaction stage 15. A pump 18 is connected by passage 19 to liquid air in compartment 17 and directs the air through passage 20 to the combustion chamber 21 which supplies working gas to the jet nozzle 21a. The liquid air in passage 20 can be first introduced to cooling passages around the combustion chamber wherein it is vaporized prior to combustion with the hydrogen fuel.

The fuel storage tank 22 for the engine contains a supply of low temperature liquid hydrogen 23 and the hydrogen is pumped through passage 24 by pump 25. The discharge from pump 25 is directed through passage 26 to the coils 27 of the liquefaction stage 15 of heat exchanger 14. The low temperature hydrogen in coils 27 passes in heat exchange relationship with the precooled air received from the precooler 13 and the resultant liquid air is collected to the compartment 17. Coils 27 are connected with coils 28 of the precooler 13 through passage 29 and in the precooler, the warmed up hydrogen encounters the incoming air in order to precool it prior to the liquefaction stage. Hydrogen gas is removed from the heat exchanger 14 through passage 30 which leads directly to the combustion chamber 21 of the engine.

The hydrogen-air ratio required in the heat exchanger 14 to produce liquid air is greatly in excess of the hydrogen-air ratio desired in the combustion chamber 21. Thus, if all of the hydrogen leaving the heat exchanger 14 by passage 30 were supplied to the combustion chamber 21, a large excess of fuel would be present. In order to prevent this undesirable effect, a portion of the hydrogen in passage 30 is withdrawn through passage 31 containing a regulating valve 31a and introduced to coils 32 of the reliquefaction heat exchanger 33. The cooled hydrogen leaves the heat exchanger 33 through passage 34 which leads to the turbo expander 35. The output shaft 36 of the turbo expander carries a plurality of turbine stages 37 and since the pressure of the hydrogen gas in passage 34 is greater than the pressure of the hydrogen in the tank 22, the hydrogen gas will expand through the turbo expander 35, producing useful work which can be utilized by other engine components.

The exhaust passage 38 from the turbo expander will contain a mixture of hydrogen liquid and hydrogen vapor which will be returned back to the tank 22 so that the non-condensed vapors are available as a coolant for the reliquefaction heat exchanger 33, and the liquid will join the stored liquid hydrogen. A passage 39 connects with upper portion of tank 22 and conducts the cold hydrogen vapor above the liquid in the tank to the heat exchanger 33, where it passes in heat exchange relationship with the hydrogen withdrawn from passage 30. The hydrogen vapor leaves the heat exchanger through passage 40 which connects with an auxiliary power producing unit 41. The unit 41 comprises a combustion chamber 42 from which pressurized gasses are expanded in a turbine 43 in order to produce a power output at shaft 44. Liquid air is supplied from passage 20 to the combustion chamber 43 by a passage 45 which contains valve 46. Thus, the hydrogen vapor leaving the heat exchanger 33 can be burnt with a regulated amount of air in order to efficiently produce an auxiliary output at shaft 43 which can be utilized by the various engine components. In the alternative, the hydrogen in passage 40 could be used in an auxiliary engine combustion chamber to produce added thrust to complement the thrust of the main combustion chamber 21.

Figure 3:
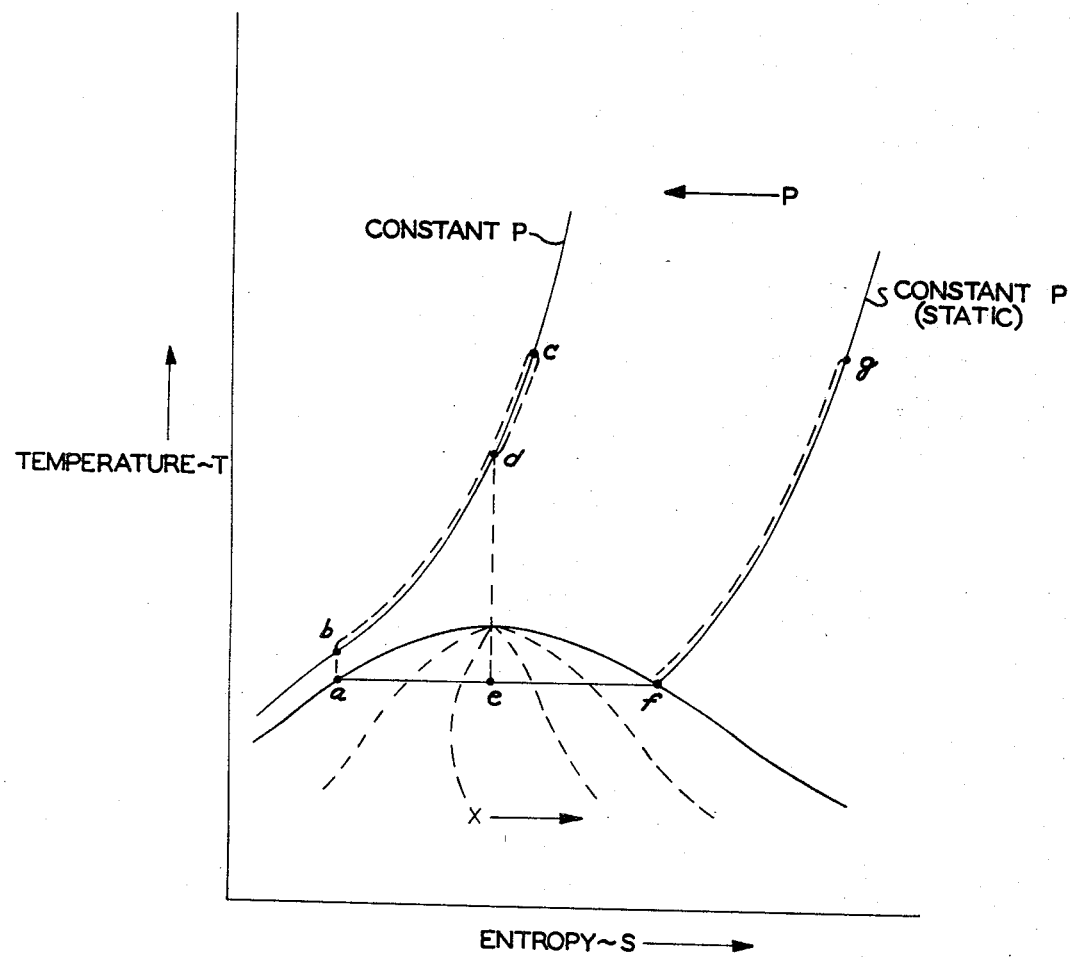
FIGURE 3 is a graphical illustration of the reliquefaction cycle of FIGURE 1.

The theoretical thermodynamic representation of the liquid air cycle with reliquefaction is illustrated in FIGURE 3 which is a plot of temperature vs. entropy. The liquid hydrogen in the tank 22 is originally in the storage tank as a saturated liquid illustrated at station $a$. The liquid is pumped up to the pressure of station $b$ isotropically by pump 25 and then heated at a constant pressure to the station $c$ by its passage through the heat exchanger 14. The portion of the hydrogen withdrawn from passage 30 and entering the reliquefaction cycle is cooled to station $d$ by passage through the reliquefaction heat exchanger 33 and this withdrawn hydrogen is then expanded through expander 35 into the two-phase region at station $e$. The portion of the expanded hydrogen which is liquid is stored in the tank and the portion which is vapor is drawn off at station $f$ for passage through the heat exchanger 33 as the coolant. The vapor is heated in exchanger 33 at constant pressure to the station $g$ at which point it enters the combustion chamber 42 of the auxiliary engine 41. It is therefore apparent that the withdrawn hydrogen gas which enters the reliquefaction cycle heat exchanger 33 is at pressure $P_c$ and at a temperature $T_c$ and that this gas is cooled to some intermediate temperature $T_d$ by exchanger 33. From this condition, the gas is passed through the turbo expander into the storage tank at temperature $T_e$ and to pressure $P_e$. The liquid phase is stored and the vapor phase is bled off at station $f$ to cool additional withdrawn hydrogen. The work from the expander turbine shaft 37 is available to drive the liquid hydrogen pump and the liquid air pump or it can be used for some other purpose.

Figure 2:
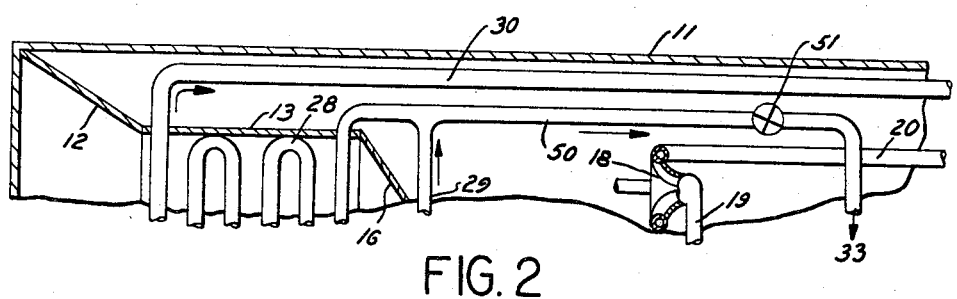
FIGURE 2 is a partial view showing a modification of the reliquefaction cycle in which hydrogen is withdrawn intermediate the ends of the main air heat exchanger.

A modification of the reliquefaction cycle is illustrated in FIGURE 2, wherein the hydrogen is withdrawn through a passage 50 which connects with the passage 29 intermediate the heat exchanger sections 27 and 28. The passage 50 contains a valve 51 and leads directly to the coils 32 of the heat exchanger 33 in the same manner as the passage 31 in the prior embodiment. Thus, the temperature of the withdrawn hydrogen entering the heat exchanger will be lower than the temperature $T_c$ illustrated in FIGURE 3 for the cycle of FIGURE 1. It is possible to withdraw the hydrogen from between the heat exchanger stages 13 and 15 since a lower fuel-air ratio can be utilized in the precooling stage 13 than in the liquefaction stage 15.

By the present invention, there is provided a reliquefaction cycle for a liquid air cycle engine which permits a reduction in the fuel consumption of the engine by preventing excess hydrogen fuel from being supplied to the main combustion chamber. While the cycle is primarily suitable for use with a liquid air cycle engine, it could also be utilized for stationary commercial plants for the production of cryogenic liquids from a gaseous state. It is apparent that the reliquefaction cycle operates independently of the condition of the hydrogen in the tank 22 since expanded vapor is simply recirculated through the reliquefaction heat exchanger 33 independently of the liquid hydrogen. However, in the event that the hydrogen in the tank 22 were sub-cooled, then the exhaust passage 38 from the turbo expander could project into the body of liquid hydrogen and bubble the expanded vapors through the sub-cooled hydrogen to obtain a further reduction in temperature of the vapor. Various other modifications are contemplated by those skilled in the art without departing from the spirit and scope of the invention as hereinafter defined by the appended claims.

What is claimed is:

1. In combination with a liquid air cycle engine having a low pressure supply tank containing low temperature liquid hydrogen for use as a fuel and for liquefying atmospheric air in a heat exchanger after pressurization to provide an oxidant for the pressurized fuel in a combustion chamber, a reliquefaction apparatus for withdrawing and liquefying a portion of the pressurized hydrogen leaving said heat exchanger in order to reduce the fuel-air ratio in the combustion chamber of the engine to a desired value below that in the heat exchanger, said reliquefaction apparatus comprising heat exchange means for cooling the withdrawn hydrogen, expansion means for expanding the cooled withdrawn hydrogen to the pressure of the hydrogen supply tank to produce a mixture of liquid hydrogen and hydrogen vapor, and conduit means connected with said tank for withdrawing vapor in the tank and introducing said vapor to said heat exchanger means as the coolant for the withdrawn hydrogen.

2. The combination of claim 1 having discharge passage means connected with the coolant vapor discharged from said heat exchanger means, and an auxiliary power unit connected with said discharge passage means for utilizing said discharged vapor as fuel.

3. An apparatus for reliquefying hydrogen gas present in a liquid air cycle engine comprising a storage tank containing a supply of low temperature liquid hydrogen, pump means for removing hydrogen from said tank and raising said removed hydrogen to a high pressure, heat exchanger means receiving said pressurized hydrogen as the coolant, means for introducing atmospheric air to said heat exchanger means to produce liquid air, combustion chamber means for producing and discharging high pressure combustion products through an exit nozzle to produce the thrust output of said engine, means for connecting the pressurized gaseous hydrogen and the liquid air leaving said heat exchange means with said combustion chamber for use as the fuel and oxidant supplies, passage means for withdrawing a portion of the pressurized gaseous hydrogen from said connecting means to reduce the fuel-air ratio in the combustion chamber to a desired value below that in the heat exchanger, a heat exchanger connected with said passage means for reducing the temperature of said withdrawn hydrogen gas, a turbo expander having its discharge end connected with said tank, means for connecting the cooled hydrogen gas discharged from said heat exchanger with said turbo expander for expansion therethrough to produce liquid hydrogen and cold hydrogen vapor in said tank, and passage means connected between said tank and said heat exchanger for supplying the cold vapor in said tank to said heat exchanger as the coolant for said withdrawn hydrogen gas.

4. In a liquid air cycle in which low temperature hydrogen fuel removed from a storage tank is pressurized and then passed in heat exchange relationship with atmospheric air in order to produce liquid air for use as an oxidant in a combustion chamber which receives pressurized hydrogen fuel discharged from the heat exchange relationship, a reliquefaction cycle comprising the steps of withdrawing a portion of the pressurized hydrogen fuel leaving said heat exchange relationship and before entering said combustion chamber in order to reduce the fuel-air ratio in the combustion chamber to a desired value below that in the heat exchanger, passing said withdrawn hydrogen fuel in heat exchange relationship with hydrogen vapor received from said tank, and thereafter expanding said cooled withdrawn hydrogen gas to the tank pressure in order to produce a mixture of liquid hydrogen and cool hydrogen vapor.

5. In a liquid air cycle as defined in claim 4, the step of collecting the coolant vapor discharged from the heat exchange relationship with the withdrawn hydrogen, and introducing said coolant vapor to an auxiliary power producing means.

6. In a liquid air cycle as defined in claim 5, the step of connecting the power producing means with the liquid air source for said combustion chamber to provide an oxidant supply for said auxiliary power producing means.

7. The method of reliquefying a portion of the hydrogen gas present in a liquid air cycle comprising the steps of removing liquid hydrogen from a low pressure storage tank and increasing its pressure, passing the high pressure hydrogen in heat exchange relationship with incoming air in order to produce liquid air, connecting the removed hydrogen discharged from the heat exchange relationship and the liquid air with a combustion chamber for combustion therein, withdrawing a portion of the hydrogen gas prior to entering said combustion chamber to reduce the fuel-air ratio in the combustion chamber to a desired value below that in the heat exchanger, passing the withdrawn gas in heat exchange relationship with cold vapor removed from said tank, and thereafter expanding the cooled withdrawn hydrogen gas to the pressure of said tank to produce liquid hydrogen to be added to the tank and cold vapor for use in the heat exchange relationship with the withdrawn hydrogen.

References Cited

UNITED STATES PATENTS

| | | | |
|---|---|---|---|
| 2,612,752 | 10/1952 | Goddard | 60—35.6 |
| 2,704,438 | 3/1955 | Sheets | 60—35.6 |
| 2,995,008 | 8/1961 | Fox | 60—35.6 |
| 3,040,520 | 6/1962 | Rae | 60—35.6 |
| 2,877,966 | 3/1959 | Summers | 60—35.6 |
| 2,932,173 | 4/1960 | Mordhorst | 62—9 |

FOREIGN PATENTS 800,267  8/1958  Great Britain.

MARTIN P. SCHWADRON, *Primary Examiner.*

DOUGLAS HART, *Assistant Examiner.*